(12) United States Patent
Snider et al.

(10) Patent No.: US 7,090,158 B2
(45) Date of Patent: Aug. 15, 2006

(54) DUAL ARBOR SCRAP CHOPPER AND CHOPPER BLADE

(75) Inventors: Kevin Brett Snider, Beeton (CA); Jason Lee Grace, Oakville (CA)

(73) Assignee: SMS Demag Ltd., Oakville (CA)

( * ) Notice: Subject to any disclaimer, the term of this patent is extended or adjusted under 35 U.S.C. 154(b) by 0 days.

(21) Appl. No.: 10/965,829

(22) Filed: Oct. 18, 2004

(65) Prior Publication Data
US 2006/0086853 A1 Apr. 27, 2006

(51) Int. Cl.
*B02C 18/16* (2006.01)

(52) U.S. Cl. ........................ 241/235; 241/294

(58) Field of Classification Search ................ 241/235, 241/294; 83/342, 345, 906, 923
See application file for complete search history.

(56) References Cited

U.S. PATENT DOCUMENTS

| | | | |
|---|---|---|---|
| 2,125,939 A | 8/1938 | MacFarren | |
| 3,000,250 A | 9/1961 | Altmann | |
| 3,084,582 A | 4/1963 | Anderson | |
| 3,799,020 A | 3/1974 | Hoelmer | |
| 3,828,636 A | 8/1974 | Smith | |
| 4,004,479 A | 1/1977 | Bodnar | |
| 4,363,453 A * | 12/1982 | Hill et al. | 241/222 |
| 4,625,605 A | 12/1986 | Buta | |
| 4,858,506 A | 8/1989 | Buta | |
| 4,893,662 A * | 1/1990 | Gervasi | 144/230 |

* cited by examiner

*Primary Examiner*—Mark Rosenbaum
(74) *Attorney, Agent, or Firm*—Gowan Intellectual Property; Gerald A. Gowan (57) ABSTRACT

A dual arbor scrap chopper is disclosed having a number of chopper blades attached to each arbor. The blades are designed to be more easily fitted into a blade recess formed on the arbor, and are preferably designed to provide a blade cutting surface which more closely resembles the optimal elliptical shape without the need for complex cutting patterns. A dual arbor scrap chopper with improved blade performance and ease of blade change-over is provided.

10 Claims, 6 Drawing Sheets

DUAL ARBOR SCRAP CHOPPER AND CHOPPER BLADE

FIELD OF THE INVENTION

This invention relates to choppers that are used to cut the scrap edge trimmings from flat sheet metal materials (or which result from other strip production processes), that necessitate the effective collection, cutting and removal of large quantities of scrap strip material.

BACKGROUND OF THE INVENTION

Prior Art devices of this type have relied on a variety of different configurations all of which are aimed at the same end result of high speed incremental chopping of strip scrap. The reader is referred to, example, U.S. Pat. No. 2,125,939, U.S. Pat. No. 3,084,582, U.S. Pat. No. 3,799,020, and U.S. Pat. No. 4,858,506 (Buta).

In U.S. Pat. No. 2,125,939, a rotary shear knife is disclosed that uses raked cutting edges on cutting knives positioned on drums so that they register as opposing knives when brought together to shear the material. Each of the knives cutting edges are of an involuted curved configuration so that the cut will be square in relation to the strip being cut.

U.S. Pat. No. 3,084,582 discloses a rotatable shearing blade device for progressive transverse cutting using a pair of blades each mounted on a separate spindle with a gear tooth mechanism inner-connecting them. Each blade is held by bolts and springs for relative adjustment. Each blade has only one cutting edge for engagement against the material to be cut.

In U.S. Pat. No. 3,799,020 a scrap chopper is shown having a fixed station knife and a multiple bladed rotary arbor aligned for cutting registration therewith.

In U.S. Pat. No. 4,858,506 a scrap chopper is shown have a dual arbor with at least one pair of blades which have been mounted in an angular, transverse relationship to the arbor. The blades themselves are defined as being in a symmetrical, multi-sided configuration wherein a front and back surface of the blade is curved on a constant radius to provide four curved cutting surfaces. As such, each side edge of the blade provides an identical cutting surface and four individual cutting edges can be selected by inverting and/or rotation of the blade. The blade is adapted to be held within a curved slot provided in the arbor, and a sound pad of variable thickness is added to assist in fitting of the blade within the slot.

Due to the arbor and blade design configurations a unique cutting ability is provided on matched counter rotation of the arbors to bring a pair of oppositely disposed blades, and their associated cutting edges, into the progressive shearing relationship which is required for cutting strip scrap material at high speed.

While this configuration has proved to be acceptable for use, precise and immovable fitting of the curved blade, within the curved blade well of the arbor, has proven to be difficult and time consuming. As such, it would be preferred to provide improved blade and arbor designs and configurations which can be more easily changed or replaced.

It is also known in the prior art that, for a dual arbor configuration, an elliptical radius on the blade provides optimal contact across the entire width of the blade. However, milling the blade to an elliptical configuration can be complex, can be difficult, and typically is not worth the additional expense involved.

As previously mentioned, in U.S. Pat. No. 4,858,506, the blade surface has a single constant radius, and the constant radius is selected in order to provide a reasonably close fit to the elliptical shape design. While this approach is acceptable for use, it would be desirable to provide a simple blade design which more closely matches the optimal elliptical design. Further, this should be achieved without significantly increasing the complexity of the blade milling operation.

SUMMARY OF THE INVENTION

Accordingly, it is a principal advantage of the present invention to provide a blade for a dual arbor scrap chopper which provides for easier and improved fitting, while providing a multi-cutting edge blade design.

It is a further advantage of the present invention to provide a blade for a dual arbor scrap chopper which more closely approximates an elliptical cutting surface than that provided by the prior art.

The advantages set out hereinabove, as well as other objects and goals inherent thereto, are at least partially or fully provided by the dual arbor scrap chopper, and dual arbor scrap chopper blades of the present invention, as set out herein below.

Accordingly, in one aspect, the present invention provides a dual arbor scrap chopper comprising:

a support housing;

a pair of oppositely disposed arbors rotatably positioned within said housing;

drive means interconnecting and controlling relative rotational speed of said arbors;

at least one mounting means on said arbor for holding a blade in angularly transverse relation to said arbor;

at least one blade secured angularly and transversely of said arbors in said mounting means on each arbor; and at least one cutting edge on each blade, which cutting edge on each blade is oppositely disposed on each arbor in order to coact upon matched rotation of said arbors, so that said cutting edges are aligned into a progressive shearing relationship on rotation of said arbor, whereby scrap metal material may be cut at high speeds, and wherein each blade is substantially the same length, height and width, and comprises a pair of spaced, substantially flat and parallel side surfaces, a substantially flat back surface, and an outwardly curved, transversely flat, front surface, wherein said cutting edge is formed at the substantially right angle intersection of each of said side surfaces and said front surface.

In a further aspect, the present invention also provides a blade for use in a dual arbor scrap chopper comprises a pair of spaced, substantially flat and parallel side surfaces, a substantially flat back surface, and a outwardly curved, transversely flat, front surface, and two cutting edges formed at the substantially right angle intersection of each of said side surfaces and said front surface.

The blade is preferably used in the dual arbor scrap chopper described hereinabove with respect to the present invention.

In a still further aspect, the present invention also provides a blade for use in a dual arbor scrap chopper comprising a pair of spaced, substantially flat and parallel side surfaces, and a outwardly curved, transversely flat, face surface, and two cutting edges formed at the substantially right angle intersection of each of said side surfaces and said face surface, wherein said curved surface of said face surface is formed having two or more circular radii.

Again, the blade is preferably used in the dual arbor scrap chopper described hereinabove with respect to the present invention.

DETAILED DESCRIPTION OF THE INVENTION

In the present application, the dual arbor scrap chopper is described with reference to its use to chop long strips of scrap metal into smaller pieces, and the present application is primarily directed to this use. However, while the present application is primarily described with particular reference to the scrap metal industry (for clarity and brevity), the skilled artisan would be aware that the dual arbor scrap chopper, and the attendant chopper blades, described in the present application are equally useful in other areas.

Accordingly, the present invention primarily provides a dual arbor scrap chopper and blades for use with high speed flat sheet trimming processes that uses multiple edge cutting blades on dual arbors for progressive registration cutting using curved cutting edge configurations.

In addition, the blades of the dual arbor scrap chopper have a curved front surface which can be used to form a pair of cutting edges, and a substantially flat back surface, which provides for easy mounting of the blade to the arbor. Also, the blade cutting surfaces are preferably fabricated so that the blade edges have at least a two, and preferably a three or more, radius design configuration.

BRIEF DESCRIPTION OF THE DRAWINGS

Embodiments of this invention will now be described by way of example only in association with the accompanying drawings in which.

DETAILED DESCRIPTION OF THE PREFERRED EMBODIMENTS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example only. In the drawings, like reference numerals depict like elements.

It is expressly understood, however, that the drawings are for the purpose of illustration and description only and are not intended as a definition of the limits of the invention.

Figure 1:
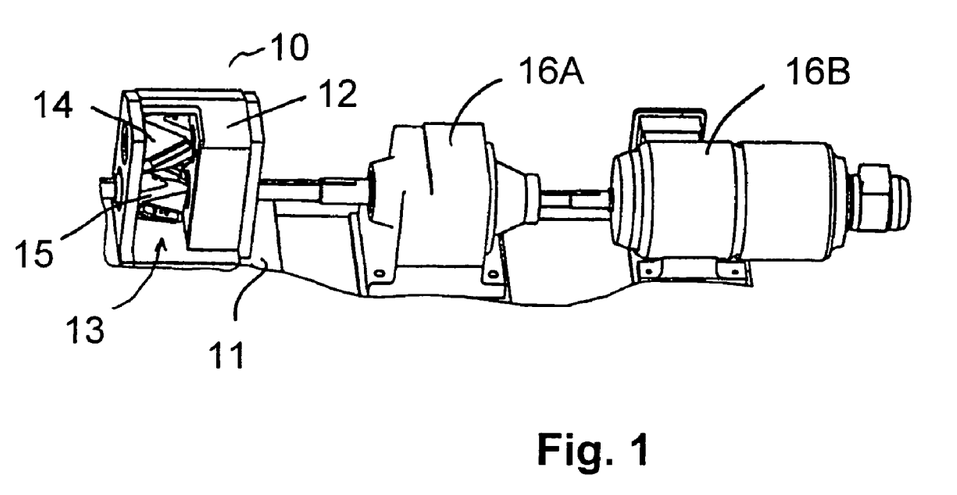
FIG. 1 is a perspective view of the dual arbor scrap chopper with associated drive unit.

Referring to FIG. 1, a dual arbor scrap chopper 10 is shown comprising a mounting enclosure 12 securing to a base 11. The mounting enclosure 12 has an opening at 13 in which is positioned a pair of rotating arbors 14 and 15. Located on each arbor are a series of cutting (or chopping) blades 24 (see FIG. 2) which align with one another to produce a cutting action, as the arbors are rotated. The arbors 14 and 15 in scrap chopper 10 are rotated using a motor 16B which is preferably connected to the arbors using associated support bearings and a speed regulator, gearing reduction mechanism 16A connected between motor 16B, and dual arbor scrap chopper 10, as will be well understood and known in the art.

The arbors shown have a diameter of 19.68 cm, although, the size of the arbor can vary depending on the application. Typically, however, the arbors preferably have identical diameters of between 10 cm and 65 cm, but values outside of this range are also possible.

The design of the dual arbor chopper is known to those skilled in the art, who can determine the arbor diameter and blade width required based on factors such as the nature of the material to be cut, the line speed, and the like. Once these factors have been determined, the blades are designed to provide the closest approximation to the elliptical line configuration in order to maximize blade efficiency while minimizing blade wear.

In this embodiment, each arbor has three blades. However, those skilled in the art would be well aware that fewer or more blades can be included on each arbor. Typically, however, each arbor has between 1 and 6 blades, and more preferably, between 2 and 4 blades. The number of blades can be higher, though, depending on the size of the arbor and the size of the material being cut.

Figure 2:
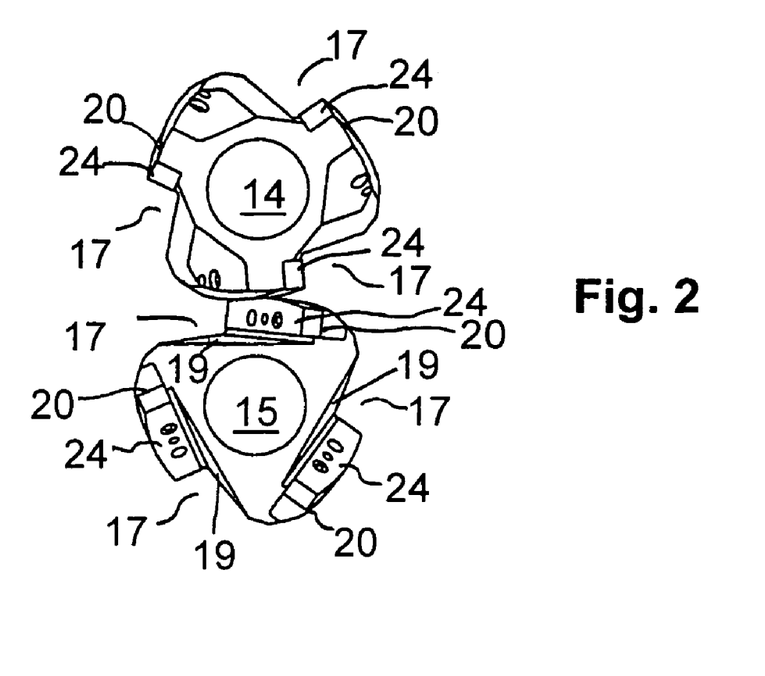
FIG. 2 is a side view of the arbor sections of the dual arbor scrap chopper shown in FIG. 1.
Figure 3:
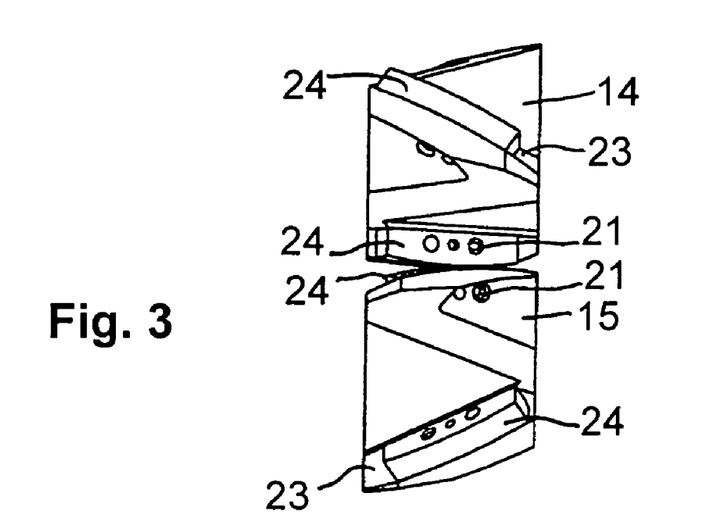
FIG. 3 is an end view of the arbors of FIG. 2.
Figure 4:
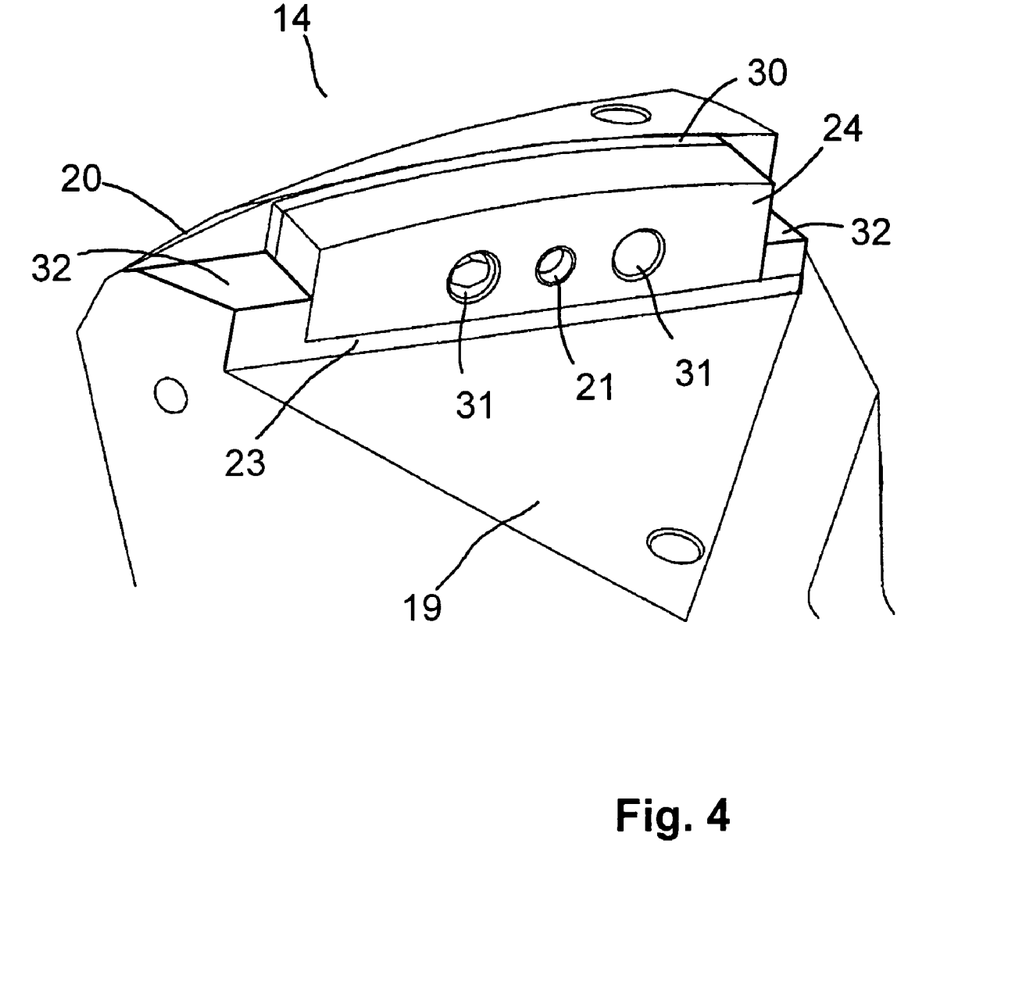
FIG. 4 is a top plan view of relative blade position on the arbor.

Referring also to FIGS. 2, 3, and 4, each of arbors 14 and 15 has an outer surface configuration defined by transverse recesses 17. A flattened surface area 19 extends from each transverse recess 17 and provides for material clearance.

Each of the transverse recesses 17 extend from flattened surface area 19 to an angular upstanding edge mount 20 which is apertured at 21 to receive a blade fastener bolt. The surface of the transverse recesses 17 are at right angles with the upstanding edge mount 20 defining a blade seat 23. Three identical blades 24 are positioned on each arbor 14, 15; one in each blade seat 23.

In FIG. 4, a front view of a cutaway portion of blade 24 is shown located in blade seat 23 formed from surface area 17 and upstanding edge mount 20.

Figure 5:
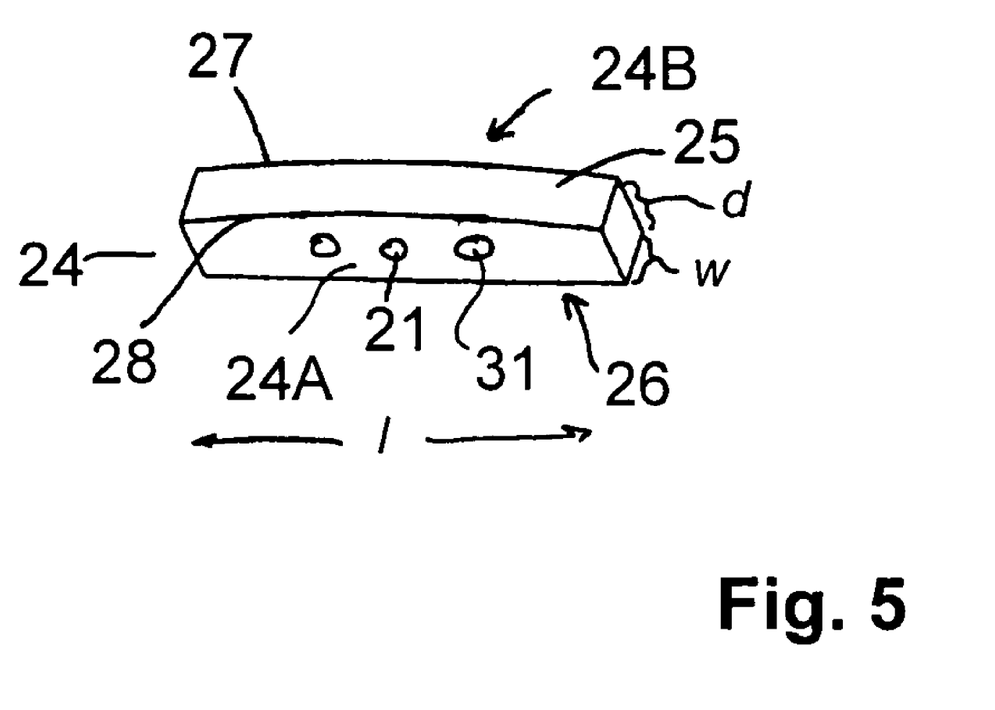
FIG. 5 is a perspective view of a single blade and its associated cutting edges.

As shown in FIG. 5, each of blades 24 is preferably made from a steel bar blank (although other materials might be used) of a known length, height and thickness having spaced parallel side surfaces 24A, and 24B. The blank is machined to form a longitudinally curved transversely flat surface 25 at right angles to side surfaces 24A and B. Each curved surface has two matching oppositely disposed cutting edges 27 and 28 formed at the top and bottom edges of longitudinally curved surface 25.

Opposite curved surface 25, at the back of blade 24, is a flat, substantially planar back surface 26. The blade seat 23 on the arbor has a two flat planar surfaces (e.g. 17 and 20) at right angles to one another, which structure conforms to either blade surfaces 24A or 24B, and back surface 26 so that blade 24 fits within blade seat 23, and rests against recess 17 and edge mount 20. Blade 24 is thereby easily fitted into place on the arbor 14 or 15.

Blade 24 is also invertible giving access to both cutting edges 27 and 28. As such, each blade has two cutting surfaces, only one of which is in use at any given time.

For blade replacement, the blade need only be unbolted, and flipped over in order to provide a new blade edge. After both edges 27 and 28 have been used, the blade 24 can be removed for refurbishment and a new or refurbished blade inserted in its place.

The blade 24 may be positioned in blade seat 23 using a dowel located within dowel location holes 31. However, in a preferred feature, blade seat 23 is machined so as to have shoulder sections 32 which form a keyway to correctly position blade 24. Blade 24 is then bolted into place using a bolt inserted into opening 21.

The size of each blade can vary depending on the arbor design. Commonly, the blade has a length (l) of between 5 and 25 cm., a width (w) of between 1 and 5 cm. and a depth (d) of between 2 and 10 cm. Again, however, the actual dimensions of the blade can be more or less than these values depending on the arbor design and the size of the material being cut.

Width (w) will vary as blade 24 is refurbished in that surfaces 24A and/or 24B are milled to provide fresh cutting edges. As such, width (w) will decrease over the life of the blade. In order to compensate for this change in width (w), a shim 30 (or shims) is inserted behind blade 24 in order for the blade edge to be located in the correct position on the arbor.

The flat, substantially planar back surface can be produced at a lower cost than some prior art blades because an essentially flat surface requires less machining time than the time required to form a blade. Further, machining a simple flat "seat" in the arbor to hold the blade, is also easier than machining a curved seat. As such, a flat, right angle "seat" 23 as shown in the drawings, is more easily produced on the arbor than the curved structure of prior art devices.

As indicated hereinabove, dowels might be used to correctly position blade 24. However, preferably, seat 23 is optionally fitted with a keyway, as shown in FIG. 4, for locating the blade laterally in the blade seat on the arbor. With this design, the bolt(s) which hold the blade in place only need to be aligned on 1 axis. In the curved, prior art design, a diamond shaped dowel was commonly used to hold the blade in place, but this required alignment of the dowels in 2 axis. As such, replacement of the prior art blades was more complex than in the current design.

With respect to the blade design, for a dual arbor chopper blade having a normal width of 1 to 5 cm, the optimum cutting surface would consist of a helical pattern with curves in 2 axis of the blade face. This helical design would permit the blades to closely align with one another during the cutting action;—across the edges and the entire surface of the blade. As such, the variance in gap (between the cutting edges of the blades) and the variance in overlap (between the blade face surfaces) would be minimized. This would provide in optimal blade life and the most effective cutting action. However, this helical pattern results in blades that likely could only be fitted in one direction, and would require a complex milling operation to produce the blade.

Figure 6:
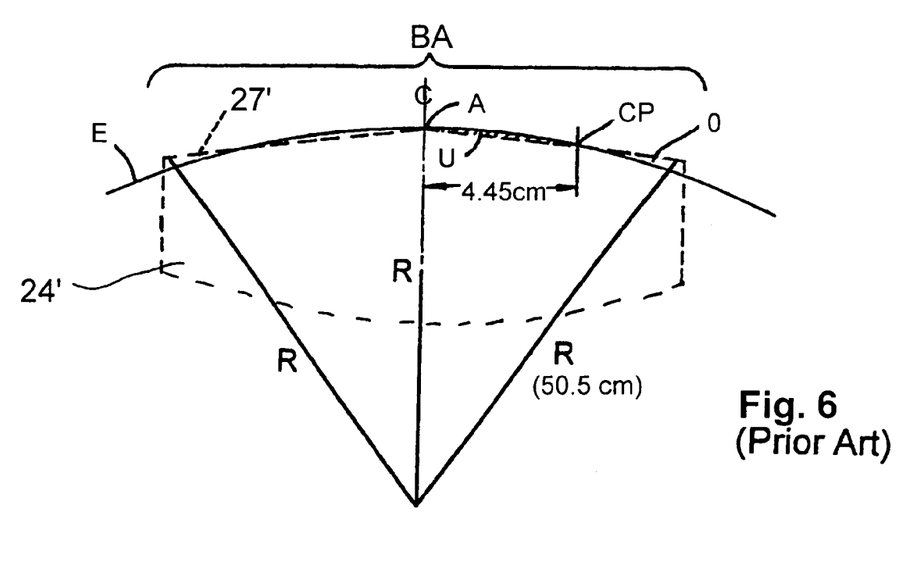
FIG. 6 is a graphic illustration of blade curve determination according to the prior art.

To avoid this complex milling operation, the prior art had a constant curve (i.e. curved in only 1 axis) across the face of the blade, as described in U.S. Pat. No. 4,858,506, and as shown in FIG. 6. While acceptable for use, it would be preferred to provide a multi-curved surface with improved properties over this constant radius design, and thus achieve a blade configuration which would be closer to an elliptical design. It would also be preferred if this could be accomplished without necessitating the time and expense of elliptical or helical blade manufacture.

Referring now to FIG. 6 of the drawings, a graphic comparison between a true elliptical line E and a selected, true radius R on a constant radius blade 24' of the prior art, is shown. Blade 24', shown in outline, is merely designed having a single, constant radius (R) design configuration.

In FIG. 6, a portion of an ellipse is represented by line E. The representative blade area i.e. the portion of the line E over which ideally the cutting edge of the blade would fall is defined by the letters BA, since in reality only a small portion of the true ellipse is used in a dual arbor configuration. The relative line position shown in FIG. 6 is exaggerated for illustration purposes.

One of the cutting edges 27' on the blade 24' is shown in broken lines superimposed over the elliptical line E. To determine an acceptable simple radius R for the curved surface 25, a crossover point CP is calculated as the distance from the centre of the blade where the line E is intersected by the proposed radius of the curved surface of the blade. An example of the same is illustrated in FIG. 6 as having a crossover point of 4.45 cm from centre with a calculated radius of 50.5 cm having no deviation from the true elliptical line E at both point A, which is the centre of the blade, and at the crossover point of 4.45 cm from the centre, as indicated by point CP. From centre A to crossover point CP, the deviation of the selected radius R is under the elliptical line E and is indicated graphically as a shaded area indicated by the letter U. Conversely past crossover point CP, the deviation of the selected radius is over or above the elliptical line E as indicated by the letter O. The amount of deviation of the selected radius from the elliptical line E that is acceptable is in direct relation to the thickness of the material to be cut. The greater the material thickness the greater the amount of deviation that can be tolerated while a thinner material must have less deviation.

However, it is desirable to minimize the amount of deviation as much as possible in order to provide more effective cutting, and also to minimize the knife gap across the full width of the blade to improve the overall blade life.

Figure 7:
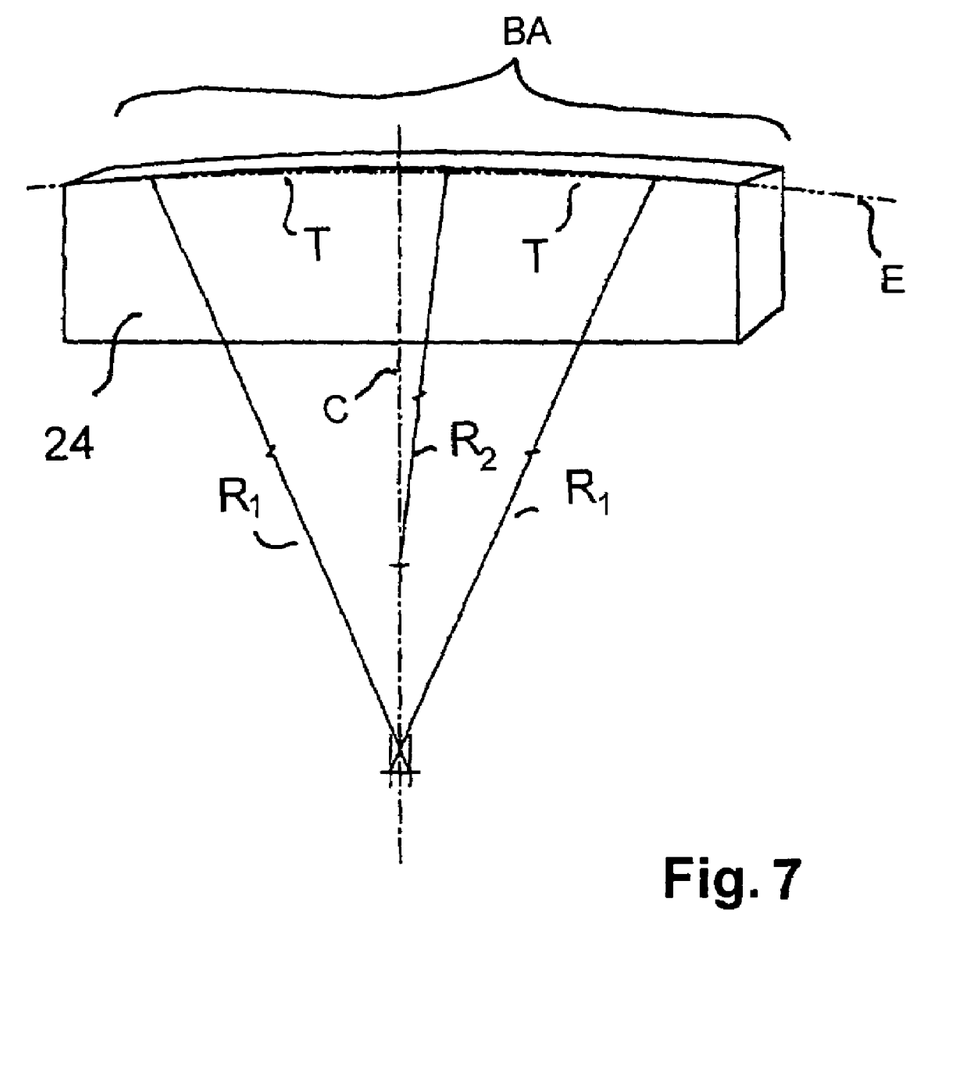
FIG. 7 is a graphic illustration of blade curve determination according to the present invention.

In FIG. 7, a blade 24, according to one aspect of the present invention is shown, which is compared over section BA to a true elliptical line E. Blade 24 is based on a three circular radius design which is symmetrical from the centre line of blade 24. The number of circular radii selected can be any value greater than or equal to 2. However, a preferred range of radii would number between 2 and 5.

An odd number of radii is also preferable since it allows a centre radii to be cut, and have a symmetrical construction from the centre of the blade. As such, a preferred number of radii would be 3 in a symmetrical design which would result in a simple, symmetrical blade design.

The radii might be have a centre point which fall on different axis lines. However, in a preferred embodiment, the centre points for all radii fall on the same axis line, and further, preferably, the centre axis line C passes through the centre of blade 24. Also, preferably, for a symmetrical design, the centre points for corresponding, non-centre portions of the blade, fall on the same point on the centre axis line, as shown in FIG. 7.

For this blade 24 design, the centre radius $R_2$ is 86.6 cm, and the radius for the outer 2 radii $R_1$ is 135.8 cm. With this design, both the centre portion 30 of blade 24, and the outer blade portions 32 are closer, overall, to line E than the prior art design. The radius selected will vary depending on the blade design, and the arbor design criteria. Typically, the radii for all blade designs will be greater than 10 cm, more preferably greater than 50 cm, and still more preferably greater than 75 cm. A preferred range of radii would be between 10 and 500 cm.

The tangent point(s) T where the blade face changes from one radius to another, such as from radius $R_2$ to radius $R_1$ for the design shown in FIG. 7, can be selected using an iterative process which mathematically compares the gap and overlap values for a blade design. Using this approach, the length of the radii, the tangent point T, and the position of centre point for each radius can be adjusted until the gap and overlap values are optimal for the selected dual arbor scrap chopper design which has been selected.

For this example, tangent points (T) of 30 mm from the end of each blade was determined to be optimal for the design criteria used.

A mathematical comparison of the gap and overlap values of two blade designs, similar to those shown in FIGS. 6 and 7, are shown in Tables 1 and 2, wherein gap and overlap values are presented for blades 24 and 24' which are manufactured having a single, constant radius design (as shown in FIG. 6), and a three-radii design (as shown in FIG. 7).

In practise, these values can vary depending on the blade size selected, and the like. However, of most interest in these results is the fact that the three-radii design provides more consistent gap and overlap values across the face of the blade. This is true on a blade design which is essentially the same size as the prior art blade. This consistency of the gap and overlap values on the blade of the present invention allows for improved cutting efficiency. This, in turn, leads to improved overall efficiency of the dual arbor chopper, while minimizing wear on the blade surface. As such, it is clearly apparent that the 3 radii design provides improved efficiency over a single, constant radius design, and more closely approximates the gap and overlap values which would be obtainable with an elliptical blade configuration.

Thus, it is apparent that there has been provided, in accordance with the present invention, a dual arbor scrap chopper and blades therefor, which fully satisfies the goals, objects, and advantages set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

Additionally, for clarity and unless otherwise stated, the word "comprise" and variations of the word such as "comprising" and "comprises", when used in the description and claims of the present specification, is not intended to exclude other additives, components, integers or steps.

Moreover, the words "substantially" or "essentially", when used with an adjective or adverb is intended to enhance the scope of the particular characteristic; e.g., substantially planar is intended to mean planar, nearly planar and/or exhibiting characteristics associated with a planar element.

Further, use of the terms "he", "him", or "his", is not intended to be specifically directed to persons of the masculine gender, and could easily be read as "she", "her", or "hers", respectively.

Also, while this discussion has addressed prior art known to the inventor, it is not an admission that all art discussed is citable against the present application.

TABLE 1

Prior Art, Single Radius Design (similar to that shown in FIG. 6)

| Distance from End of Blade (mm) | Knife Gap (mm) | Overlap (mm) |
| --- | --- | --- |
| 5 | 0.1421 | 0.3962 |
| 15 | 0.0928 | 0.102 |
| 25 | 0.0622 | 0.2488 |

TABLE 1-continued

Prior Art, Single Radius Design (similar to that shown in FIG. 6)

| Distance from End of Blade (mm) | Knife Gap (mm) | Overlap (mm) |
| --- | --- | --- |
| 40 | 0.0451 | 0.5775 |
| 55 | 0.0538 | 0.7972 |
| 75 | 0.0864 | 0.9042 |
| 95 | 0.1189 | 0.7948 |
| 110 | 0.1272 | 0.5734 |
| 125 | 0.1097 | 0.2433 |
| 135 | 0.0787 | 0.1059 |
| 145 | 0.0288 | 0.4043 |

Blade: Length (l): 150 mm
Edge Radius (R): 68.5 cm (Constant)
Depth (d): 53.6 mm
Width (w): 25 mm

TABLE 2

Three Radii Design (similar to that shown in FIG. 7)

| Distance from End of Blade (mm) | Knife Gap (mm) | Overlap (mm) |
| --- | --- | --- |
| 5 | 0.069 | 0.1458 |
| 15 | 0.069 | 0.1497 |
| 25 | 0.068 | 0.1809 |
| 40 | 0.065 | 0.2437 |
| 55 | 0.064 | 0.3018 |
| 75 | 0.069 | 0.3249 |
| 95 | 0.064 | 0.2988 |
| 110 | 0.065 | 0.2385 |
| 125 | 0.068 | 0.1745 |
| 135 | 0.069 | 0.1436 |
| 145 | 0.069 | 0.139 |

Blade: Length (l): 145 mm
Edge Radius - Centre ($R_2$): 86.6 cm
Edge Radius - End(s) ($R_1$): 135.8 cm
Depth (d): 65 mm
Width (w): 50 mm
Location of Tangent Point (T): 30 mm from each end (determined by an interative process)

We claim:

1. A dual arbor scrap chopper comprising:
a support housing;
a pair of oppositely disposed arbors rotatably positioned within said housing;
drive means interconnecting and controlling relative rotational speed of said arbors;
at least one mounting means on said arbor for holding a blade in angularly transverse relation to said arbor;
at least one blade secured angularly and transversely of said arbors in said mounting means on each arbor; and
at least one cutting edge on each blade, which cutting edge on each blade is oppositely disposed on each arbor in order to coact upon matched rotation of said arbors, so that said cutting edges are aligned into a progressive shearing relationship on rotation of said arbor, whereby scrap metal material may be cut at high speeds, and
wherein each blade is substantially the same length, height and width, and comprises a pair of spaced, substantially flat and parallel side surfaces, and a outwardly curved, transversely flat, face surface, and two cutting edges formed at the substantially right angle intersection of each of said side surfaces and said face surface, wherein said curved surface of said face surface is formed from two or more circular radii.

2. A dual arbor scrap chopper as claimed in claim 1 wherein each blade has a substantially flat back surface.

3. A dual arbor scrap chopper as claimed in claim 2 wherein said mounting means comprises two substantially flat right angled surfaces against which, said substantially flat back surface, and at least one of said substantially flat side surfaces of said blade, will rest.

4. The dual arbor scrap chopper of claim 1 wherein said drive means for said arbors comprises a motor and an inner-connected speed regulation mechanism with gearing reduction.

5. A blade for use in a dual arbor scrap chopper comprising a pair of spaced, substantially flat and parallel side surfaces, a substantially flat back surface, and a outwardly curved, transversely flat, face surface, and two cutting edges formed at the substantially right angle intersection of each of said side surfaces and said face surface, wherein said curved surface of said face surface is formed having two or more circular radii.

6. A blade as claimed in claim 5 additionally comprising a pair of spaced, substantially flat and parallel top and bottom surfaces at right angles to said side surfaces and said back surface.

7. A blade as claimed in claim 5 wherein said curved surface is formed having three circular radii.

8. A blade as claimed in claim 7 wherein said curved surface is symmetrical, and all of the circular radii used to produce said curved surface are formed from circles having centre points resting on a centre axis line which is perpendicular to said curved surface.

9. A blade as claimed in claim 5 wherein said curved surface is symmetrical.

10. A blade as claimed in claim 5 wherein said curved surface is formed wherein said circular radii meet, on said curved surface, at a point where the curved surfaces of adjacent circular radii are most closely tangential to each other.

* * * * *